(12) United States Patent
Herndon (10) Patent No.: US 11,580,091 B2
(45) Date of Patent: Feb. 14, 2023

(54) METHOD OF ENSURING CONFIDENTIALITY AND INTEGRITY OF STORED DATA AND METADATA IN AN UNTRUSTED ENVIRONMENT

(71) Applicant: NORTHROP GRUMMAN SYSTEMS CORPORATION, Falls Church, VA (US)

(72) Inventor: Marc T. Herndon, Orlando, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 290 days.

(21) Appl. No.: 17/093,818

(22) Filed: Nov. 10, 2020

(65) Prior Publication Data

US 2022/0147508 A1  May 12, 2022

(51) Int. Cl.
| | |
|---|---|
| *G06F 21/60* | (2013.01) |
| *G06F 16/23* | (2019.01) |
| *G06F 16/13* | (2019.01) |
| *G06F 11/14* | (2006.01) |
| *H04L 9/06* | (2006.01) |

(52) U.S. Cl.
CPC ...... *G06F 16/2365* (2019.01); *G06F 11/1469* (2013.01); *G06F 16/137* (2019.01); *G06F 21/602* (2013.01); *H04L 9/0643* (2013.01); *G06F 2201/805* (2013.01)

(58) Field of Classification Search
CPC ............... G06F 16/2365; G06F 16/137; G06F 11/1469; G06F 21/602; G06F 2201/805; G06F 21/60; G06F 21/62; G06F 21/64; H04L 9/0643
See application file for complete search history.

(56) References Cited

U.S. PATENT DOCUMENTS

| | | | |
|---|---|---|---|
| 7,840,995 B2 | 11/2010 | Curran et al. | |
| 7,949,693 B1* | 5/2011 | Mason | ................ G06F 21/6227 |
| | | | 707/828 |
| 8,099,605 B1 | 1/2012 | Billsroem et al. | |
| 9,268,964 B1 | 2/2016 | Schepis et al. | |
| 9,836,471 B2 | 12/2017 | Kaplan et al. | |
| 10,452,849 B2 | 10/2019 | Vroom et al. | |
| 2002/0051179 A1* | 5/2002 | Someno | ................ G06F 3/1213 |
| | | | 358/1.15 |
| 2010/0229005 A1 | 9/2010 | Herman et al. | |

(Continued)

*Primary Examiner* — Malcolm Cribbs
(74) *Attorney, Agent, or Firm* — John A. Miller; Shumaker, Loop & Kendrick, LLP (57) ABSTRACT

A system and method for storing and recovering a computer file. The method includes calculating fingerprint data of the file, separating the file into a plurality of data sub-files each having the same size and a single data sub-file having a smaller size than the other data sub-files, and attaching file metadata to the single data sub-file or as a metadata sub-file. The method also includes padding the single data sub-file including the metadata so that it is the same size as the plurality of data sub-files or the metadata sub-file so that it is the same size as the plurality of data sub-files, adding a header to each data sub-file that includes information about the sub-file, assigning a unique filename to each data sub-file, encrypting each data sub-file, and storing each data sub-file as separate files under their unique filename.

19 Claims, 5 Drawing Sheets

(56) References Cited

U.S. PATENT DOCUMENTS

| | | | |
|---|---|---|---|
| 2012/0051657 A1* | 3/2012 | Lamanna | G06F 40/194 382/218 |
| 2013/0013931 A1 | 1/2013 | O'Hare et al. | |
| 2013/0246807 A1 | 9/2013 | Orsini et al. | |
| 2016/0239683 A1* | 8/2016 | Gujral | G06F 21/6272 |

* cited by examiner

METHOD OF ENSURING CONFIDENTIALITY AND INTEGRITY OF STORED DATA AND METADATA IN AN UNTRUSTED ENVIRONMENT

BACKGROUND

Field

This disclosure relates generally to a system and method for encrypting data files for storage and, more particularly, to a system and method for encrypting data files for storage that includes dividing the files into equal size sub-files and storing the sub-files under unique filenames.

Discussion of the Related Art

When not being used, computer files are usually stored on a drive, for example, uploaded to a cloud or network server to be later recovered. Stored files are usually encrypted for security purposes to prevent others from seeing the file's content. Once a file is stored the owner relies on the contract of the underlying file system to return the file exactly as it was stored, upon request. If the stored file is altered, intentionally by an adversary or inadvertently through hardware error or "bit rot", the file owner often has no way to detect or correct these changes.

Personal record files, multimedia files and application data files all look different when they are stored in their original form. When a data file is stored, even if the file is encrypted for security, there is information about the file, such as the name and type or extension of the file, the size of the file, the date the file was created and last modified, etc., known as metadata, that can be accessed. In an untrusted environment, this small amount of information about the file could be aggregated to leak sensitive information or to provide an adversary an advantage in attacking a specific file. At the most basic level, the filename might give away information about the type of data being stored or the nature of the business that owns the data.

As an example, on some military programs "fact of" knowledge about the use of specific equipment on specific platforms can be considered classified. This knowledge might be aggregated from multiple unclassified sources. An adversary that can view a storage location containing files named "(U)_F-123_Public_Release_Notes.docx" and "(U)_KG-321_Specification_Sheet.pdf" might deduce that the F-123 platform employs a KG-321 encryption device, which might in the aggregate be classified information. This is in spite of the fact that the two files might be stored encrypted and the adversary would be unable to read the files' contents. The adversary in this case need not be intentionally hostile, but could be a system administrator at a cloud service or colocation provider who is able to view the names and other metadata about files stored by their clients.

As another example, an adversary attempting to attack encrypted files might choose to target files with names like '.pem' or 'passwords.docx' in hopes of recovering a user's private keys or passwords. If multiple such files are present, the adversary might go after files with the most recent modification dates, or the largest file sizes, to maximize their reward upon success. Such files could be considered higher value targets than files of, for example, '.mp3' type or files that are several years old. Concealing a file's name and other metadata prevents an adversary from making this value judgement and conducting a targeted attack.

There are two main ways to conceal the metadata of a stored file. Specifically, the metadata can be altered directly, for example by changing filenames and dates, or the file can be encapsulated into another file or files such that the file system's stored metadata now refers to the encapsulating file rather than the original file. Directly altering a filename and extension is not challenging. A file named 'secret file.docx' could have the name enciphered or encrypted and transformed into a string of letters prior to storage such as 'abcde.xyz'. Creation, modification and access dates can all be overwritten with dummy dates, however if the process is intended to be reversible, a novel approach would be required to recover the original dates upon file retrieval. File size is the most challenging to obscure, as a file can always be padded with extra data, but cannot generally be shortened. Padding a file with enough extra data to meaningfully confuse an adversary would be extremely wasteful in terms of storage capacity. Additionally, if not done correctly, for example, padding with only 00's, this could reveal weaknesses in the encryption scheme being used to protect the data content, thus reducing the overall security of the stored data. For these reasons, direct alteration of metadata is not a preferred solution.

Encapsulation of files into dummy files is a better approach to concealing metadata. As a rudimentary example, sensitive files could be archived into a password protected '.zip' file prior to storage, such that the metadata of the files inside the .zip is hidden from anyone without the password. However, this is not a practical approach as it would require retrieving and unarchiving the entire .zip file any time a single file within the archive needed to be accessed, but it demonstrates the concept.

A more practical approach to encapsulation of files might be to create several large binary files in the untrusted storage environment, then store the real file data at offsets inside of those files. For example an adversary might only see 10 large files named '1.bin' through '10.bin' each 1 GB in size. The user might have a file named 'secret file.docx' stored inside '2.bin' at offset 16384. A technique like this could achieve a similar whitening of the stored data, protecting file metadata and could even provide high integrity. The primary disadvantage of this approach, however, is that it is more suitable to local file systems or colocation environments where direct access to physical hardware is available. In a cloud storage environment, depending on the provider, direct access to offsets within files is often not provided. Therefore, in this example the entire 1 GB binary file would need to be retrieved in order to access offset 16384 and retrieve the user's encapsulated file. However, just like the .zip example this is extremely wasteful of bandwidth and creates large amounts of latency.

Concerning maintaining the integrity of stored data files, there are a number of ways commonly used to provide this capability today. Two of the most common are storing files along with a hash digest, such as that produced by sha256sum, and storing files along with parity information or error correction codes, such as via Parchive (.PAR, .PAR2) files. The use of a digest as an integrity mechanism is a relatively low security measure in this case because an adversary with the ability to modify a file likely also has the ability to modify or replace the digest stored alongside it. This can be overcome by protecting the digest through a digital signature or message authentication code, however that adds far more complexity than is typically invested for simple file integrity. Also, a digest is only able to indicate whether or not an alteration has been made to the original file, it is unable to provide any form of correction to recover the original data. For these reasons, digests are commonly used to verify that files downloaded over unreliable networks are received intact, rather than verifying that the data returned from a disk is identical to the data which was stored.

Parchive tools create index files that provide a similar capability to digests as described above. However, Parchive tools also provide redundant copies of the data that can be used to reconstruct original files when alterations are detected. In this way, a variable level of integrity protection can be provided. The disadvantage of this approach is that the Parchive files are specifically associated with the original files that they are protecting, via filename.

As an example, a file named 'secret file.docx' would traditionally be stored with a digest named 'secret file.docx.sha256sum' or a Parchive index named 'secret file.PAR2'. In order to provide redundancy the Parchive tool might also create files named 'secret file.vol00+10.PAR2' and 'secret file.vol01+13.PAR2'. Because the redundancy data is associated with the original file by name, an adversary is able to target the files together.

SUMMARY

The following discussion discloses and describes a system and method for storing and recovering a confidential computer file. The method includes calculating fingerprint data of the file, separating the file into a plurality of data sub-files each having the same size and a single data sub-file having a smaller size than the other data sub-files, and attaching file metadata to the single data sub-file or as a metadata sub-file. The method also includes padding the single data sub-file including the metadata so that it is the same size as the plurality of data sub-files or the metadata sub-file so that it is the same size as the plurality of data sub-files, and creating a plurality of redundancy sub-files each having the same size as the plurality of data sub-files. The method further includes adding a header to each data and redundancy sub-file that includes information about the sub-file, assigning a unique filename to each data and redundancy sub-file, and encrypting each data and redundancy sub-file. The method then stores each data and redundancy sub-file as separate files under their unique filename.

When the file is recovered, the method identifies the stored data and redundancy sub-files that are associated with the file, decrypts the identified data and redundancy sub-files, and detects integrity errors in the decrypted data sub-files using the sub-file header. The method then rebuilds the data sub-files that have integrity errors using the redundancy sub-files, removes the headers and padding from the data sub-files, reconstructs the file using the decrypted and rebuilt data sub-files and the metadata, and determines that the reconstructed file is complete using the fingerprint data.

Additional features of the disclosure will become apparent from the following description and appended claims, taken in conjunction with the accompanying drawings.

DETAILED DESCRIPTION OF THE EMBODIMENTS

The following discussion of the embodiments of the disclosure directed to a system and method for encrypting data files for storage that includes dividing the files into equal size sub-files, adding redundancy sub-files of the same size and storing the sub-files under unique filenames is merely exemplary in nature, and is in no way intended to limit the disclosure or its applications or uses.

Figure 1:
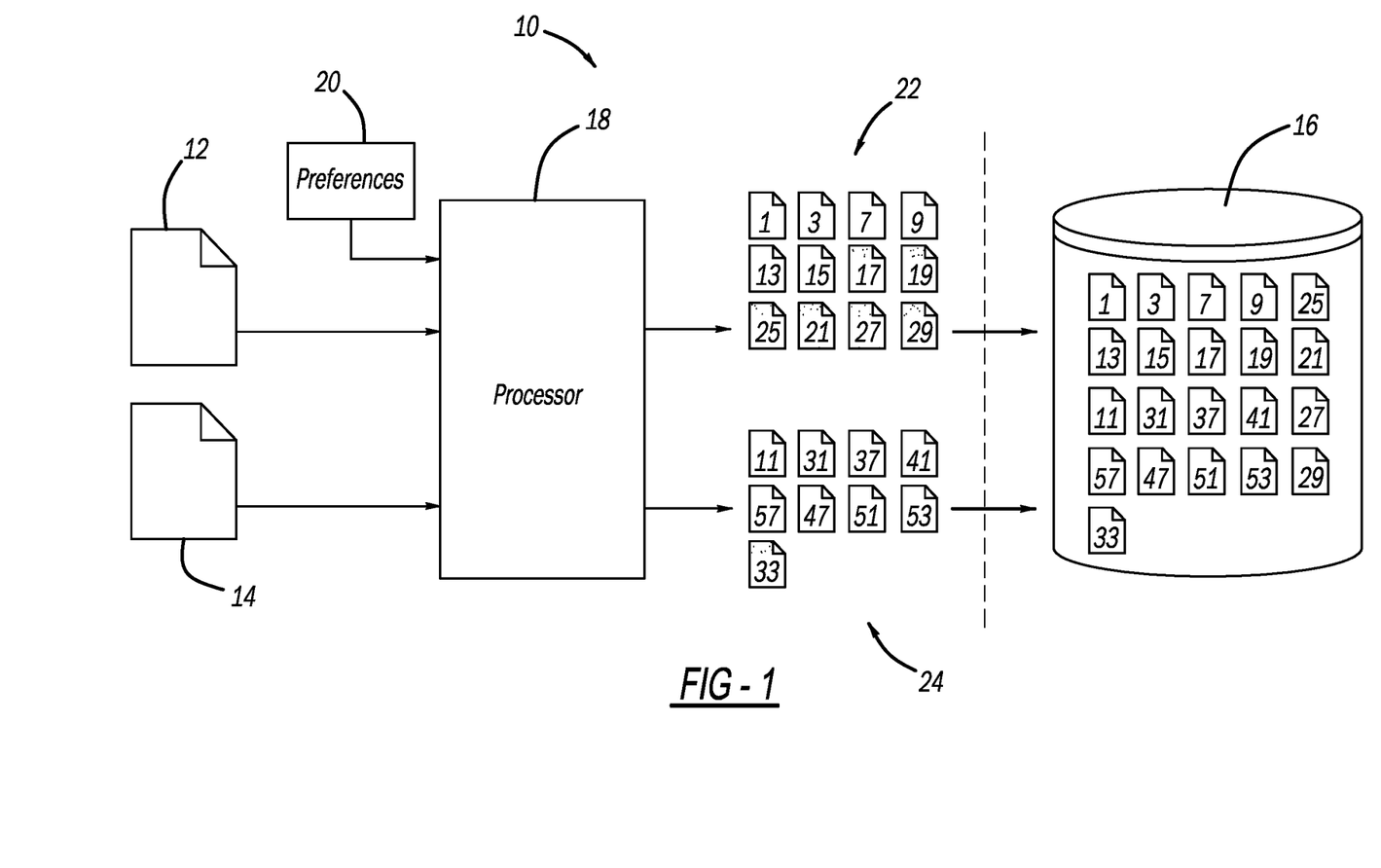
FIG. 1 is a block diagram of a computing system showing a process for storing a confidential data file.

FIG. 1 is a block diagram of a computing system 10 that employs a process for securely storing a more important computer file 12 and a less important computer file 14 in a storage device 16, such as cloud storage, where both the confidentiality and integrity of both the data and the metadata of the files 12 and 14 is maintained while being stored. The files 12 and 14 are generated in a computer, such as a laptop, and provided to a processor 18 in the computer to be encrypted in the manner discussed herein, where the files 12 and 14 will include certain metadata, such as the size of the file, the date it was created, the date it was modified, etc. Additionally, risk factor and preference information at box 20, such as level of confidentiality and integrity, system performance targets, etc., can be provided to the processor 18 identifying the level of importance and other factors the user wants certain files or groups of files to have.

As will be discussed in detail below, the processor 18 operates various algorithms for generating a number of sub-files 22 and 24 from the files 12 and 14, respectively, and the preference information, where each of the sub-files 22 and 24 is of the same size and type and is encrypted. The sub-files 22 and 24 are designated with a unique sub-file name, here an odd number for representative purposes, but in reality will likely be a long string of pseudo-random characters, such as numbers and letters. Some of the sub-files 22 and 24 are unshaded and represent the data and information in the files 12 and 14, respectively, and other of the sub-files 22 and 24 are shaded representing redundancy sub-files. The number of shaded sub-files 22 and 24 is determined by the predetermined risk factors and preferences so that for more important files, more of the data is made redundant so that the likelihood that those files can be recreated is increased. However, the more redundant data that is provided, the more processing and storage space is required. In this example, the risk factors and preferences were set so that the sub-files 22 for the file 12 included six redundancy sub-files and the sub-files 24 for the file 14 included one redundancy sub-file. The sub-files 22 and 24 are then stored in the device 16, and since they are all of the same size and file type, an unauthorized user will not be able to identify any useful metadata in any of the sub-files 22 and 24. When the user requests the file 12 or 14, the algorithm knows what sub-files 22 and 24 are associated with the file 12 or 14 and will decrypt and reconstruct the sub-files 22 and 24 accordingly.

FIGS. 2-7 illustrate a sequence of file storage operations that the algorithm or algorithms operating in the processor 18 perform to confidentially store, for example, the important file 12 in the device 16. In a first storage step illustrated by FIG. 2, fingerprint data is computed for the file 12 and then the file 12 is separated into a certain number of equal-sized data chunks 40, each representing the development of one of the unshaded sub-files 22, where a last data chunk 42 may not be as long as the other data chunks 40 because of the size of the file 12 and the splitting process that is being used. For example, a 300 KB file could be separated into 64 KB chunks, which would give four full 64 KB chunks and one 44 KB chunk.

Figure 2:
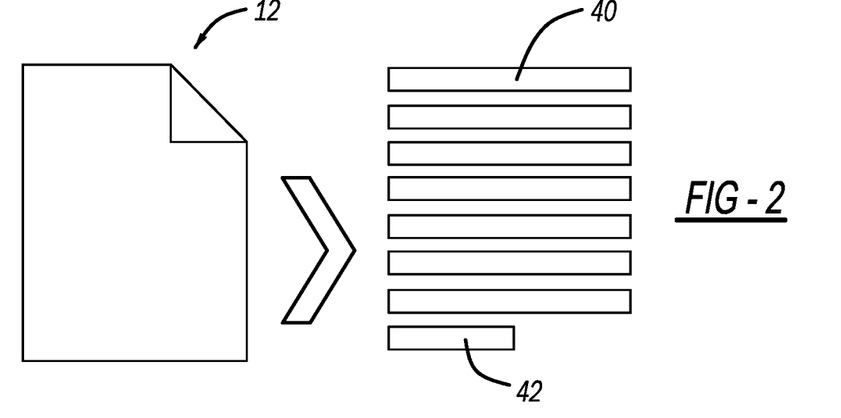
FIGS. 2-7 illustrate a series of steps for storing the confidential data file.

The fingerprint data is computed using either a cryptographic hash function, such as MD5, SHA-256, or a message authentication code (MAC), such as HMAC. The fingerprint data could also be computed using a cyclic redundancy check (CRC) or similar non-cryptographic algorithm. This data does not provide "security" against attackers, it is only a unique fingerprint of what information the algorithm started with, so it does not need to be as robust as other parts of the algorithm.

The splitting of the file 12 into the data chunks 40 is done based on the user preferences regarding performance, storage efficiency and security provided at the box 20. A value needs to be identified for the "chunk size", for example, a 100 kB file could be divided into 100×1 kB of the chunks 40 or 2×50 kB of the chunks 40. Larger chunk sizes improve both the performance of the algorithm and the transfer speed of the sub-files 22 to the storage device 16. However, larger chunk sizes are less efficient in terms of storage capacity, where the algorithm will consume more space on disk, and they offer less granularity in the amount of file integrity that can be provided. For example, with 100×1 kB chunks the minimal level of integrity that can be provided is one extra chunk, i.e., a total of 101 kB. More integrity could be provided with a second chunk, totaling 102 kB, and a very large amount of integrity could be provided with many additional chunks, totaling 200 kB or more. With 2×50 kB chunks, the minimum level of integrity that can be provided is one extra chunk, totaling 150 kB, and the next step would require two chunks, totaling 200 kB. If the user threshold for storage efficiency required consuming no more than 200 kB for the file 12, then the large chunks only offer two options for the amount of integrity provided, while the small chunks provide many more. The larger chunk size is not as flexible in optimizing the tradeoff between storage efficiency vs. security.

One implementation is a variable chunk size in which the user's preferences for performance, storage efficiency, confidentiality and integrity are used to select one or more possible chunk sizes. Smaller files might be divided into 64 kB chunks and larger files are divided into 1 MB chunks, for example. User preferences that value performance and storage efficiency over confidentiality and integrity would tend to allow a larger number of options for chunk sizes, and the chunk sizes would be larger on average. User preferences that value security over performance and efficiency would allow less options for chunk sizes (potentially only one option) and the chunk sizes would be smaller on average. The algorithm could apply these preferences on a per user, per partition, or per file basis, to give the user as much flexibility as possible.

Figure 3:
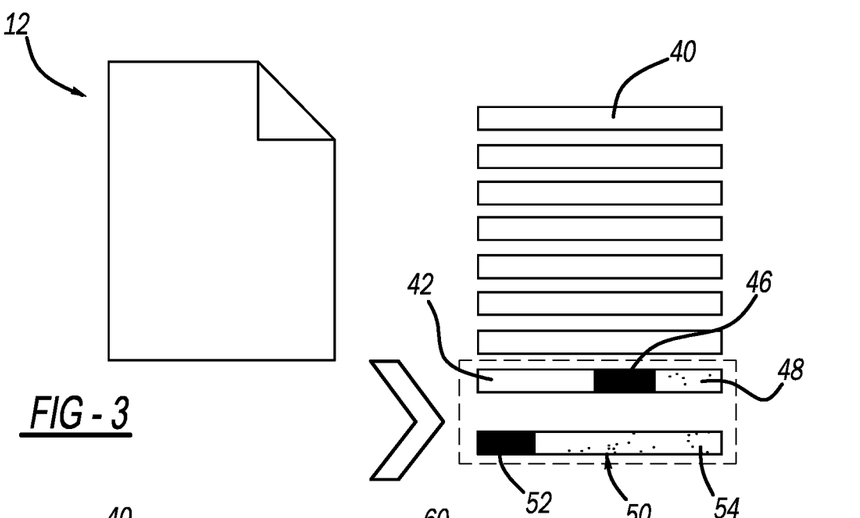

In a second storage step illustrated by FIG. 3, the metadata of the file 12 is processed and then the last chunk 42 is padded out, i.e., with additional bits, to be the same length as the other chunks 40. The metadata is represented by metadata section 46 in the last chunk 42 and the padding is represented by padding section 48 in the last chunk 42. Alternately, if there isn't enough room in the last chunk 42 for the metadata, a new chunk 50 can be generated where section 52 is the metadata and section 54 is the padding to make the new chunk 50 the same length as the other chunks 40. The metadata and padding would consist of the file's regular and extended attributes that are resident in the current file system and the fingerprint data computed in the first storage step. The attributes would simply be read from the file system and stored inside a sub-file. The metadata could be encoded or compressed to take up less space if necessary. The padding could be done a number of ways, most obviously by adding 0000 . . . 0000's or 1111 . . . 1111's to the end of the sub-file 22 until it is the correct length. Any character pattern could be chosen and repeated to complete the sub-file 22, such as A5 . . . A5's. One approach would be a slightly more complicated padding scheme that contains the original length of the sub-file 22 prior to the padding being added. An example of such an approach would be Merkle-Damgård-compliant padding.

Figure 4:
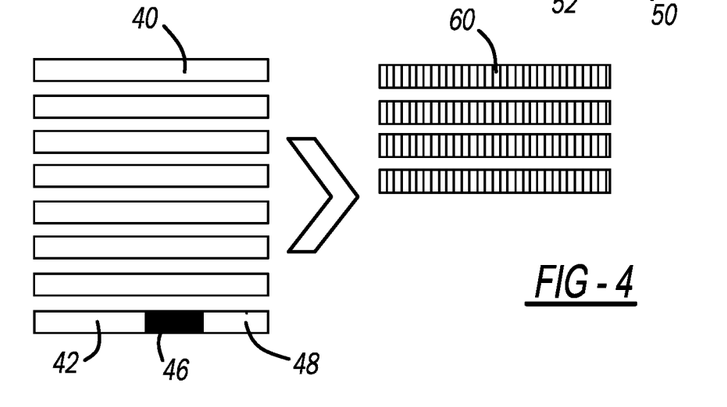

In a third storage step illustrated by FIG. 4, the algorithm uses the user's preferences to determine how much redundant data to compute and which redundancy algorithms to use to compute that data, where sub-file redundant chunks 60 represent the development of the shaded sub-files 22. If the user is not concerned about extra integrity for their data, the algorithm can compute zero additional redundant sub-files. If the user is extremely concerned about the integrity of the data, full copies of all of the sub-files 22 can be created. Obviously the redundancy data created will consume extra storage capacity in the cloud or on disk, which is why the user would determine the level of tradeoff they're willing to make. FIG. 4 shows a middle of the road approach where ~50% extra redundant data is computed. A number of error correction codes such as simple parity, hamming codes, erasure codes, low density parity-checks, etc. could be used to create different amounts of protection for the user's data. There is no preferred implementation, as the best implementation would depend on optimizing the user's preferences to get the most possible integrity for the least possible additional storage.

Figure 5:
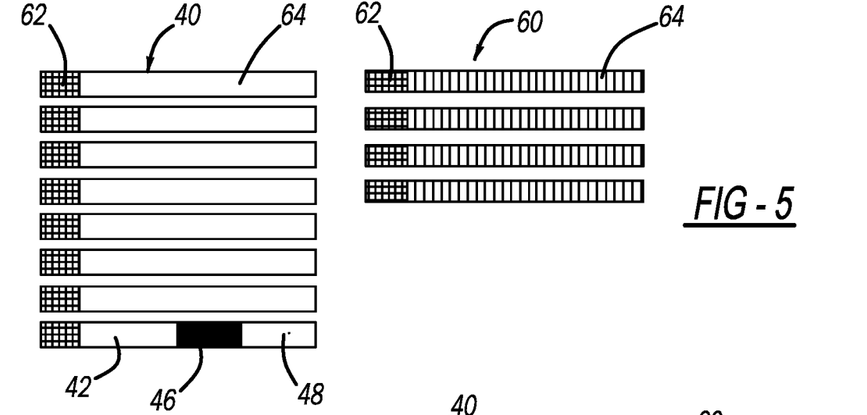

In a fourth storage step illustrated by FIG. 5, the algorithm stores information necessary to reverse itself and put the file 12 back together when requested. The algorithm puts that information as header sections 62 in front of data sections 64 in each of the chunks 40 and 60. Note that not every header section 62 has to contain the exact same information, where some header sections 62 might need more or less or different types of information in order to properly reassemble the sub-files 22 into the file 12. The types of information stored in the header sections 62 could include the sub-file's name and/or ID and the total number of the sub-files 22 that make up the file 12, the name or ID of the file 12 of which this sub-file 22 is a part, pointer(s) to later sub-file(s) in the sequence, checksum(s) of the header section 62 and/or data section 64, information about which redundancy algorithm(s) were used and any "seed values" derived from user preferences that affect how redundancy data should be interpreted, and initialization vectors and/or nonces for any cryptographic operations. Essentially, any information the algorithm needs to properly reassemble the sub-files 22 back into the file 12 would be stored in the header sections 62.

Figure 6:
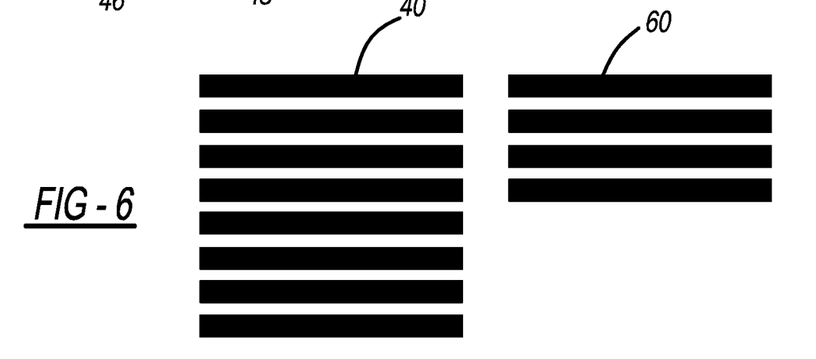
Figure 7:
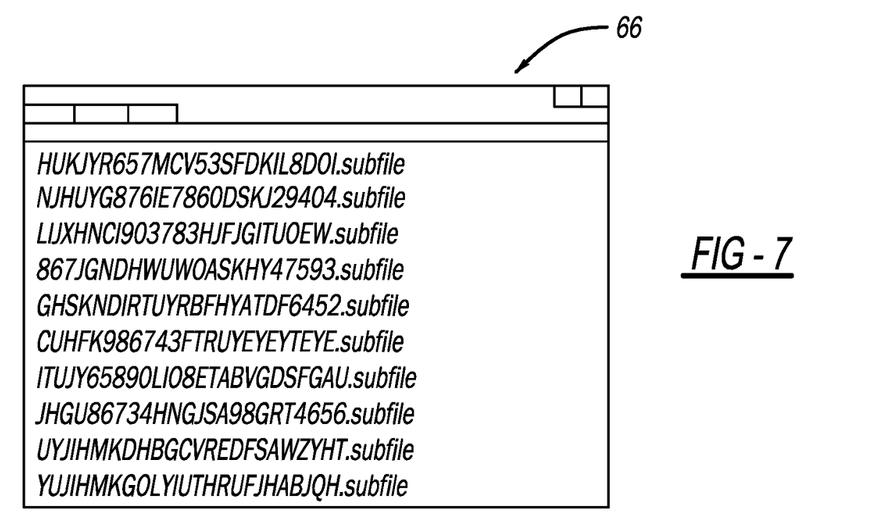
Figure 8:
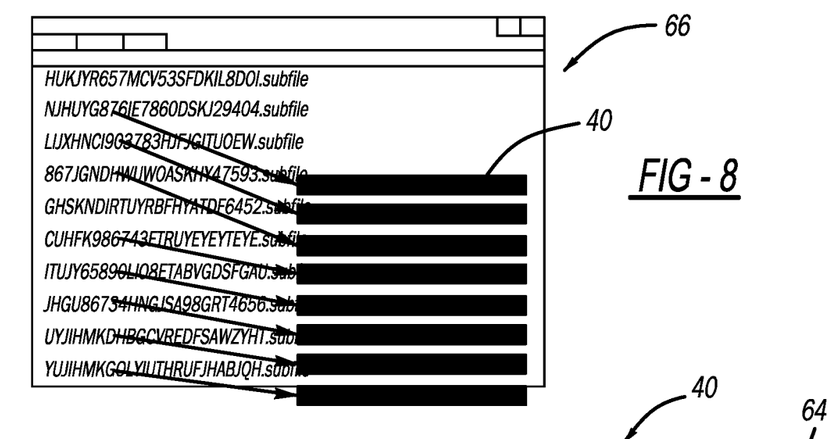
FIGS. 8-12 illustrate a series of steps for recovering the stored confidential data file.

In a fifth storage step illustrated by FIG. 6, each chunk 40 and 60 is encrypted (represented by dark shading) to generate the sub-files 22 and then in a sixth storage step illustrated by FIG. 7, the sub-files 22 are stored as individual files in the storage device 16 by a unique name, represented by the string of numbers and letters in a window 66. These two steps essentially constitute the current "state of the art" that would be performed by a user without the benefit of this disclosure. In a traditional system, the user would skip the first through fourth storage steps, then encrypt the file 12 in the fifth storage step and upload it to the device 16 in the sixth storage step. This would result in an encrypted file sitting in the storage device 16. An adversary would not be able to read the file's contents, but they would know several things about the file, including its size, how long ago it was updated, and from the filename or type (.doc) whether it was a "high value" file worth attacking. The algorithm being described adds the first through fourth storage steps into this process, ensuring that what is observable on the storage device 16 is instead a collection of encrypted sub-files, all with apparently random filenames and otherwise indistinguishable from one another. An adversary is not able to determine anything about the original files or their value by examining these sub-files.

There is one last thing the algorithm needs to do, and it can be done during any of the first through fourth storage steps. Particularly, the algorithm needs to identify the unique, pseudo-random filename for each of the sub-files 22 before it can store them in the device 16 in the sixth storage step. For example, if the file 12 was split into three sub-files 22, those sub-files might be assigned the following three filenames, which are uploaded to the storage device 16 at the sixth storage step.

30fa9140e968679fdcba17c935367c73775bdde0.subfile
6d1cfe7ec4cd1cbaa1bdc4eed8e782548ca66e4f.subfile
a8358b7a52aa79faafba3f4083fb9fce8d8d6548.subfile There are three major requirements on this naming function. Particularly, the naming function must be deterministic, such that when the user requests to retrieve the file 12 the algorithm can run the naming function again and determine that the three sub-files 22 are the sub-files 22 required to be downloaded from the storage device 16 in order to reassemble file 12.

The naming function must be restricted to contain only characters that are legal for a given file system. It is noted that all of the filename examples in this write-up are shown in hexadecimal notation (0-9 and a-f), however the naming function could use other encoding schemes such as base-64 so that the filenames can be shorter. As an example, the second sub-file name above (starting w/ 6d1) would be the same as:

bRz+fsTNHLqhvcTu2OeCVlymbk8=.subfile, in base-64. Most file systems have several illegal characters that may not be used in filenames, such as \, / and !, so the naming function would have to prevent encodings using those characters. Further, the naming function must be restricted to produce filenames of a legal length for a given file system. Many file systems do not allow names over 255 characters, for example.

There are a number of ways to perform this naming operation. The most obvious would be through use of a hash function, for example, using the MD5 hash function:

MD5("Secret File.docx")=406166e3412fb30809931-e2a640e12bf.

One simple technique would be to use that result as the filename for the first sub-file, and then chain the MD5 operation again, e.g. MD5("406166e3412fb30809931e-2a640e12bf")=d8cf286464579a3a7ad2b786e68b731e to determine the name of the second sub-file, and so on.

There are two major problems with this naïve approach. If an attacker knows the name of the file they are looking for, they can run the same naming function to determine which sub-files make up that file. For example, an attacker might brute force search for the MD5 output of filenames ending in '.pem' or '.kdbx' looking for files containing encryption keys or password databases. Modern hardware can compute billions of hash operations per second so if the naming function is a simple hash it would invalidate much of the security benefit of "randomizing" the filenames.

Inevitably the naming function will have to deal with the problem of filename collisions. It is possible that MD5 ("Secret File.docx") and MD5("Another File.xlsx") both give the same value, however two different sub-files can't share the same filename in the storage device 16, so the algorithm will have to account for that.

Similarly, MD5 ("6d1cfe7ec4cd1cbaa1bdc4eed8e782548ca66e4f.subfile") from above could produce the same value as MD5("Yet another file.jpg"). The more files that are stored, the more sub-file names will be created and the more chances for filename collisions will exist.

Dealing with the first problem is simple. Rather than only using a hash function, the naming function would use some other information known by the user in order to change the output in a way that the attacker could not guess. This could be done a number of ways including incorporating a user "salt" into the hash of the original filename, compute a keyed-hash (HMAC) or other MAC of the original filename, or combine an encryption algorithm with the hash function to produce either an encryption of the hash of the filename, or a hash of the encryption of the filename. The preferred approach would be one of the options involving a cryptographic component, in other words, not the "salt" option. However, none of these approaches helps with the second problem, collisions.

In order to resolve the second problem the naming function needs to be able to compute alternate filenames for sub-files whose filenames would collide with a file already stored. For example, consider the windows operating system. If a file in a folder is named "Secret File.docx" and a user wants to create a second file in the folder with the same filename, Windows will usually name the second file "Secret File(1).docx". At the simplest level, the naming function could perform this same kind of operation (adding characters to the filename) to avoid collisions. As long as the naming function is deterministic in its behavior there is no preferred approach to how alternate filenames are computed, as this does not affect the security of the algorithm.

Note that the header sections 62 described in the fourth storage step must contain all of the information necessary to guarantee that the correct and complete set of the sub-files 22 is obtained in order to reassemble the file 12. This would include information necessary to de-conflict filename collisions. If there was a collision where both MD5("Secret File.docx") and MD5("Another File.xlsx") resulted in the name:

406166e3412fb30809931e2a640e12bf.subfile, then the naming function would produce an alternate filename for one of them. However, when the user attempts to retrieve "Secret File.docx" or "Another File.xlsx", the algorithm would need to be able to determine which of the sub-files 22 belonged to the file 12, whether the one with the original filename or the alternate filename. This is why the naming function must run after the first storage step when the data chunks 40 are first created, and before, or during, the fourth storage step when the header information is added to the sub files 22.

FIGS. 8-12 illustrate a sequence of file recovery steps that the computer system 10 including the processor 18 performs to recover the stored file 12 from the storage device 16. When a user wants to retrieve the file 12 the first thing the algorithm must do is repeat the naming function to determine which of the sub-files 22 in the device 16 make up the file 12. The required sub-files 22 are then downloaded and decrypted, and the data they contained is provided to the algorithm. This is simply a first recovery step that is the reverse operation of the fifth and sixth storage steps described above as illustrated in FIG. 8.

Figure 9:
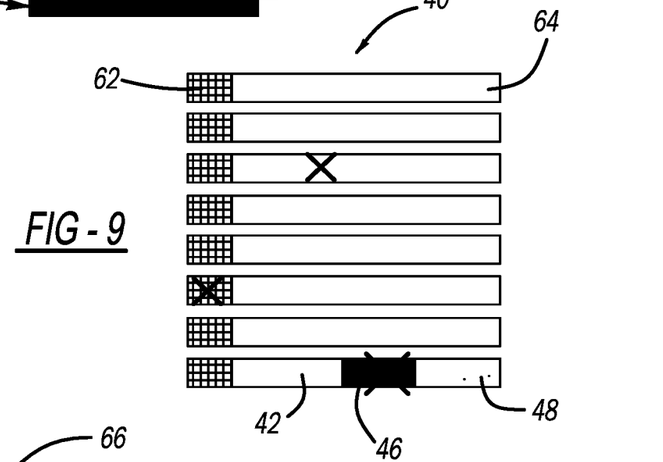

In a second recovery step as illustrated by FIG. 9, the algorithm confirms that it has all of the sub-files 22 required to reassemble the file 12. There are a number of "problem scenarios" that could occur at this stage, some of which are represented in FIG. 9. These include that there could be data corruption in one or more of the header sections 62, there could be data corruption in one or more of the data sections 64, there could be data corruption in the metadata section 46, and there could be data corruption in the padding section 48, where the corruption is represented by an X. Note also that depending on how the naming function is implemented, and how it deals with filename collisions, some of the downloaded sub-files 22 at this point might not belong to the requested file at all. In this case, information present in the header sections 62 would allow the naming function to determine the correct alternate filenames and download and decrypt the remaining required sub-files 22. This step should provide enough integrity to guarantee that all data corruption issues are detected. Some forms of data corruption can also be corrected in this step, if the appropriate integrity data is available in the header sections 62. However, the primary job of this step is not to correct errors, but only to ensure that all of the required data is present and detect any data that is in error.

Figure 10:
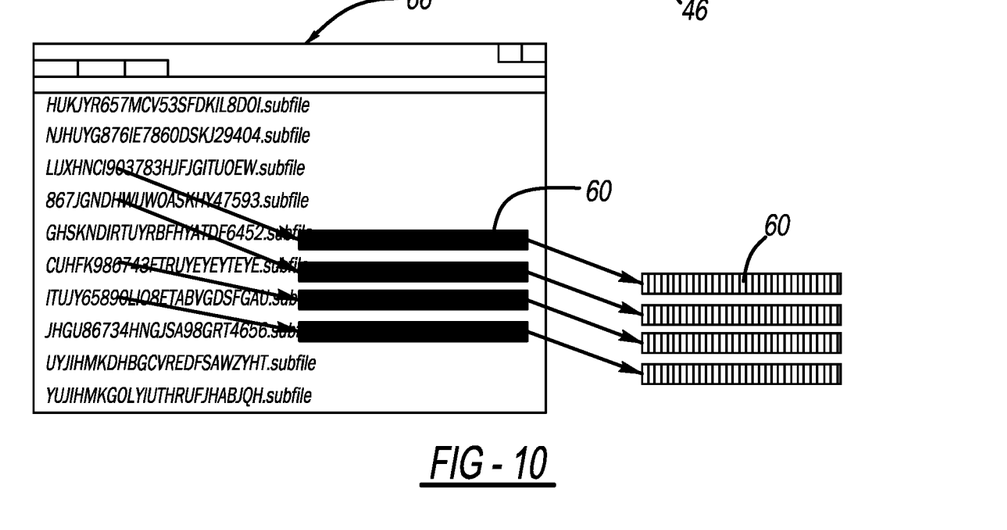

In a third recovery step as illustrated by FIG. 10, the algorithm works to correct any errors detected in the data recovered in the second recovery step. In addition to the "problem scenarios" described above, examples of larger errors that can be corrected at this stage include one or more of the sub-files 22 were too badly damaged to be repaired in the second recovery step and one or more of the sub-files 22 were completely missing and unable to be downloaded in the first recovery step. The amount of errors that this step can correct is completely dependent on how much redundancy data was generated when originally storing the file 12, which was done according to user preferences in the third storage step. Information in the header sections 62 tells the algorithm which redundancy algorithm(s) were used and how to interpret the extra redundancy data in order to correct different kinds of errors.

Figure 11:
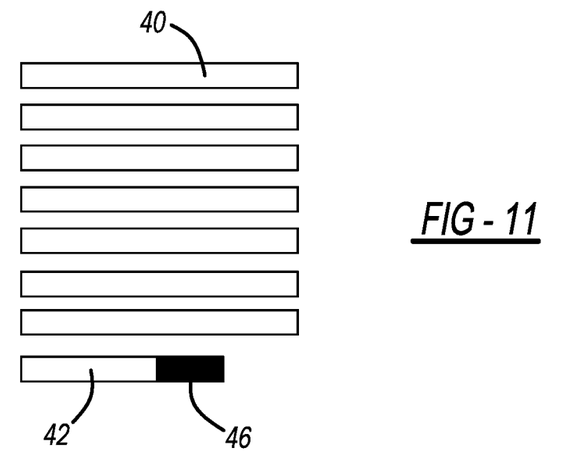

In a fourth recovery step as illustrated by FIG. 11, all of the original file's data and metadata is known in the form of the data chunks 40. Not shown in FIG. 11 is the original file's fingerprint from the first storage step, which would have been retained with the original file's metadata. Essentially all that is done in this step is throw away the sub-file header sections 62 and the padding sections 48, since they are no longer needed.

Figure 12:
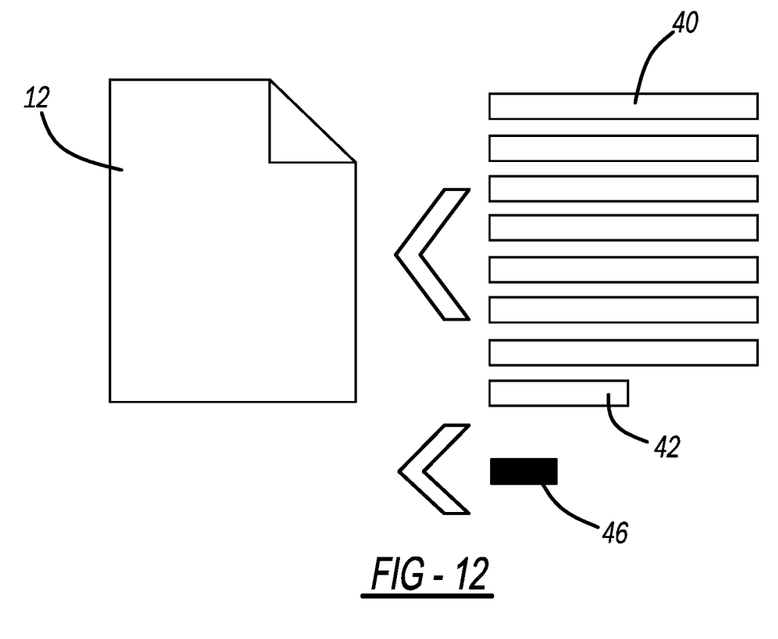

In a fifth recovery step as illustrated by FIG. 12, the file 12 is created on the user's local file system using the name of the original, requested file. The data in the data chunks 40 is stored in the file 12 in sequential order, and the metadata information is re-applied to the file attributes in a file system appropriate way. The only difference between this step and the ordinary process of downloading a file off the internet is that the algorithm will, optionally per user's preference, restore the file attributes and metadata. In other words, when the file 12 is downloaded from storage device 16 normally, the downloaded file will say it was created and modified on today's date at the time it was downloaded. Using the algorithm after the downloaded file is reassembled, the algorithm can configure those attributes to their original creation and modification dates, if desired, because that metadata was stored along with the chunks 40.

The final thing to do is make 100% sure that there is no difference between the original file 12 the user started with and the file now reassembled by re-calculating the fingerprint data and compare it to what was obtained from the fourth recovery step, or the first storage step. This repeats the same integrity function that was performed in the first storage step and makes sure the results match. If the fingerprints match, it is guaranteed that the file 12 the algorithm started with and the file 12 it gave back to the user are 100% identical.

The foregoing discussion discloses and describes merely exemplary embodiments of the present disclosure. One skilled in the art will readily recognize from such discussion and from the accompanying drawings and claims that various changes, modifications and variations can be made therein without departing from the spirit and scope of the disclosure as defined in the following claims.

What is claimed is:

1. A method for storing and recovering a computer file, said method comprising:
   calculating fingerprint data of the file;
   separating the file into a plurality of data sub-files each having the same size and a single data sub-file having a smaller size than the other data sub-files;
   attaching file metadata to the single data sub-file or as a metadata sub-file;
   padding the single data sub-file including the metadata so that it is the same size as the plurality of data sub-files or the metadata sub-file so that it is the same size as the plurality of data sub-files;
   creating a plurality of redundancy sub-files each having the same size as the plurality of data sub-files;
   adding a header to each data and redundancy sub-file that includes information about the sub-file;
   assigning a unique filename to each data and redundancy sub-file;
   encrypting each data and redundancy sub-file; and
   storing each data and redundancy sub-file as separate files under its unique filename.

2. The method according to claim 1 further comprising:
   identifying the stored data and redundancy sub-files that are associated with the file;
   decrypting the identified data and redundancy sub-files;
   detecting integrity errors in the decrypted data sub-files using the sub-file header;
   rebuilding the data sub-files that have integrity errors using the redundancy files;
   removing the headers and padding from the data sub-files;
   reconstructing the file using the decrypted and rebuilt data sub-files and the metadata; and
   determining that the reconstructed file is complete using the fingerprint data.

3. The method according to claim 1 further comprising assigning a common file type to each sub-file, and wherein storing each data and redundancy sub-file includes storing each data and redundancy sub-file under the file type.

4. The method according to claim 1 wherein calculating fingerprint data includes using a hash function or a message authentication code (MAC).

5. The method according to claim 1 wherein separating the file into a plurality of data sub-files is done based on predetermined user preferences for performance, storage efficiency and security.

6. The method according to claim 1 wherein adding a header includes adding a header having one or more of the sub-file filename or ID, a total number of sub-files that make up the file, the filename or ID of the file of which each sub-file is a part, pointers to other sub-file in a sequence of sub-files, basic checksums of the header, the fingerprint data, information about which integrity algorithms were used and any seed values derived from user preferences that affect how integrity data should be interpreted, and initialization vectors and/or nonces for any cryptographic operations.

7. The method according to claim 1 wherein assigning a unique filename to each data and redundancy sub-file includes using a hash function or other cryptographic function.

8. The method according to claim 1 wherein assigning a unique filename to each data and redundancy sub-file includes assigning a pseudo-random character sequence.

9. The method according to claim 1 wherein assigning a unique filename to each data and redundancy sub-file includes preventing filename collisions.

10. The method according to claim 1 wherein storing each data and redundancy sub-file includes storing each data and redundancy sub-file in the cloud or on a local or networked file system.

11. A method for storing and recovering a computer file, said method comprising:
   calculating fingerprint data of the file;
   separating the file into a plurality of data sub-files;
   attaching file metadata to one of the data sub-files or as a metadata sub-file;
   adding a header to each data sub-file that includes information about the sub-file;
   assigning a unique filename to each data sub-file;
   encrypting each data sub-file;
   storing each data sub-file as separate files under its unique filename;
   identifying the stored data sub-files that are associated with the file;
   decrypting the identified data sub-files;
   detecting integrity errors in the decrypted data sub-files using the sub-file header:
   removing the headers from the data sub-files;
   reconstructing the file using the decrypted data sub-files and the metadata; and
   determining that the reconstructed file is complete using the fingerprint data.

12. The method according to claim 11 further comprising assigning a common file type to each sub-file, and wherein storing each data sub-file includes storing each data sub-file under the file type.

13. The method according to claim 11 wherein calculating fingerprint data includes using a hash function or a message authentication code (MAC).

14. The method according to claim 11 wherein separating the file into a plurality of data sub-files is done based on predetermined user preferences for performance, storage efficiency and security.

15. A system for storing and recovering a computer file, said system comprising:
   means for calculating fingerprint data of the file;
   means for separating the file into a plurality of data sub-files each having the same size and a single data sub-file having a smaller size than the other data sub-files;
   means for attaching file metadata to the single data sub-file or as a metadata sub-file;
   means for padding the single data sub-file including the metadata so that it is the same size as the plurality of data sub-files or the metadata sub-file so that it is the same size as the plurality of data sub-files;
   means for adding a header to each data sub-file that includes information about the sub-file;
   means for assigning a unique filename to each data sub-file;
   means for encrypting each data sub-file; and
   means for storing each data sub-file as separate files under its unique filename.

16. The system according to claim 15 further comprising:
   means for creating a plurality of redundancy sub-files each having the same size as the plurality of data sub-files;
   means for adding a header to each redundancy sub-file that includes information about the sub-file;
   means for assigning a unique filename to each redundancy sub-file;
   means for encrypting each redundancy sub-file; and
   means for storing each redundancy sub-file as separate files under its unique filename.

17. The system according to claim 15 further comprising:
   means for identifying the stored data sub-files that are associated with the file;
   means for decrypting the identified data sub-files;
   means for removing the headers and padding from the data sub-files;
   means for reconstructing the file using the decrypted and rebuilt data sub-files and the metadata; and
   means for determining that the reconstructed file is complete using the fingerprint data.

18. The system according to claim 15 further comprising means for assigning a common file type to each sub-file, and wherein storing each data sub-file includes storing each data sub-file under the file type.

19. The system according to claim 15 wherein the means for separating the file into a plurality of data sub-files uses predetermined user preferences for performance, storage efficiency and security.

* * * * *